US009553829B2

(12) United States Patent
Wang et al.

(10) Patent No.: US 9,553,829 B2
(45) Date of Patent: Jan. 24, 2017

(54) APPARATUS AND METHOD FOR FAST SEARCH TABLE UPDATE IN A NETWORK SWITCH

(71) Applicant: XPLIANT, INC., San Jose, CA (US)

(72) Inventors: Weihuang Wang, Los Gatos, CA (US); Mohan Balan, Santa Clara, CA (US); Srinath Atluri, Fremont, CA (US)

(73) Assignee: CAVIUM, INC., San Jose, CA (US)

( * ) Notice: Subject to any disclaimer, the term of this patent is extended or adjusted under 35 U.S.C. 154(b) by 177 days.

(21) Appl. No.: 14/540,927

(22) Filed: Nov. 13, 2014

(65) Prior Publication Data
US 2016/0142342 A1 May 19, 2016

(51) Int. Cl.
H04L 12/28 (2006.01)
H04L 12/931 (2013.01)
H04L 12/747 (2013.01)
H04L 12/773 (2013.01)
H04L 12/741 (2013.01)
H04L 12/771 (2013.01)

(52) U.S. Cl.
CPC .............. *H04L 49/65* (2013.01); *H04L 45/54* (2013.01); *H04L 45/563* (2013.01); *H04L 45/60* (2013.01); *H04L 45/742* (2013.01)

(58) Field of Classification Search
CPC ........ H04L 49/65; H04L 45/46; H04L 45/745; H04L 45/54; H04L 45/563; H04L 45/60; H04L 45/742
See application file for complete search history.

(56) References Cited

U.S. PATENT DOCUMENTS

| 6,141,738 | A | 10/2000 | Munter | |
|---|---|---|---|---|
| 7,111,071 | B1 | 9/2006 | Hooper | |
| 7,724,734 | B1 | 5/2010 | Grosser | |
| 7,801,130 | B2* | 9/2010 | Sheppard | H04L 45/02 370/389 |
| 7,827,218 | B1 | 11/2010 | Mittal | |
| 8,223,666 | B2* | 7/2012 | Jarvis | H04L 45/02 370/254 |
| 8,817,616 | B2* | 8/2014 | Iwao | H04L 45/02 370/230.1 |
| 2001/0042130 | A1 | 11/2001 | Brown | |
| 2010/0293327 | A1 | 11/2010 | Lin | |
| 2011/0082866 | A1 | 4/2011 | Brown | |
| 2012/0243539 | A1 | 9/2012 | Keesara | |
| 2014/0269723 | A1 | 9/2014 | Wang | |
| 2015/0319086 | A1* | 11/2015 | Tripathi | H04W 12/06 370/254 |

* cited by examiner

*Primary Examiner* — Brian O'Connor
(74) *Attorney, Agent, or Firm* — Duane Morris LLP; David T. Xue

(57) ABSTRACT

A network switch comprises a plurality of packet processing units configured to process a received packet through multiple packet processing stages based on search result of a table. The network switch further comprises one or more memory units configured to maintain the table to be searched and provide the search result to the packet processing units. The network switch further comprises a table managing unit configured to accept a plurality of rules on bulk update to the table specified by a control unit, and perform the bulk update on the table based on the rules specified by the control unit without the control unit accessing the table directly for the bulk update.

25 Claims, 4 Drawing Sheets

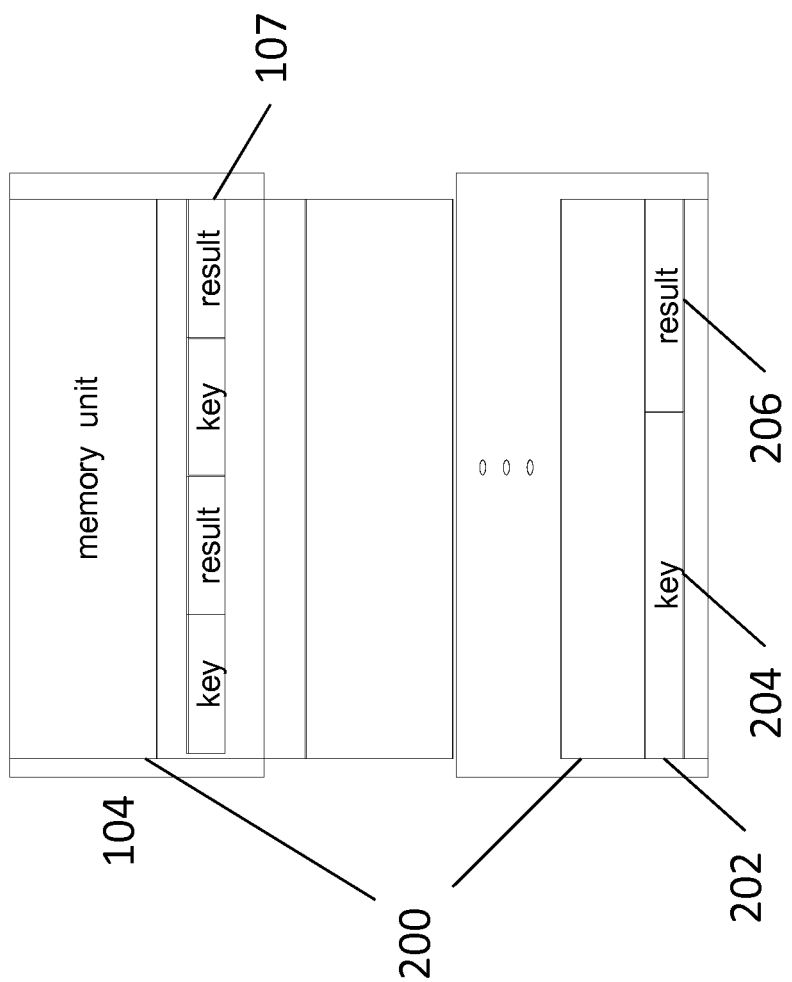

| Field | Description |
|---|---|
| update_en | Enable bulk table update. |
| update_priority | If set, update is higher priority than traffic. |
| memory_unit_id | |
| start_addr | |
| end_addr | |
| match_mask | Same width as memory line. Bit value of 1 indicates participating in the match |
| match_pattern | Same width as memory line. |
| subst_mask | Same width as memory line. Bit value of 1 indicates participating in the substitution. |
| subst_pattern | Same width as memory line. |
| entry_width | Width of {key, result} pair. |

FIG. 3

APPARATUS AND METHOD FOR FAST SEARCH TABLE UPDATE IN A NETWORK SWITCH

TECHNICAL FIELD

The present application relates to communications in network environments. More particularly, the present invention relates to performing table searches in a high speed network processing unit.

BACKGROUND

Network switches/switching units are at the core of any communication network. A network switch typically has one or more input ports and one or more output ports, wherein data/communication packets are received at the input ports, processed by the network switch through multiple packet processing stages, and routed by the network switch to other network devices from the output ports according to control logic of the network switch.

Table search has been widely adopted for the control logic of the network switch, wherein the network switch performs search/lookup operations on the tables stored in the memory of the switch for each incoming packet and takes actions as instructed by the table search results or takes a default action in case of a table search miss. Examples of the table search performed in the network switch include but are not limited to: hashing for a Media Access Control (MAC) address look up, Longest-Prefix Matching (LPM) for Internet Protocol (IP) routing, wild card matching (WCM) for an Access Control List (ACL) and direct memory access for control data. The table search in the network switch allows management of network services by decoupling decisions about where traffic/packets are sent (i.e., the control plane of the switch) from the underlying systems that forwards the packets to the selected destination (i.e., the data plane of the switch), which is especially important for Software Defined Networks (SDN).

During its operation, the condition and/or status of the network switch may change, which may require the tables in the memory of the network switch to be updated accordingly to reflect such change. For a non-limiting example, when one of the output ports of the network switch is down, all traffic/packets currently being routed to the port need to be rerouted to another port and all relevant entries in the routing tables of the network switch need to be updated with the destination (MAC) address of the new port. For another non-limiting example, if an enterprise user would like to switch all of its machines from one virtual local area network (VLAN) to another, all routing tables for packets from these machines need to be updated to reflect such change.

Traditionally, updates to the tables in the network switch are performed by an external control unit/controller, which monitors the status of the network switch and performs updates on the tables directly. Since a table to be updated may be huge in size (e.g., having over one million entries), identifying all entries in the table that need to be updated and replacing all the identified entries with new data would consume a lot of computing resources (e.g., CPU and memory) of the control unit. In addition, when the control unit is updating the table remotely over a communication network, the instructions from the control unit to the switch to search and update the relevant entries in the table one by one would cause communication bottleneck between the control unit and the network switch.

The foregoing examples of the related art and limitations related therewith are intended to be illustrative and not exclusive. Other limitations of the related art will become apparent upon a reading of the specification and a study of the drawings.

SUMMARY

A network switch comprises a plurality of packet processing units configured to process a received packet through multiple packet processing stages based on search result of a table. The network switch further comprises one or more memory units configured to maintain the table to be searched and provide the search result to the packet processing units. The network switch further comprises a table managing unit configured to accept a plurality of rules on bulk update to the table specified by a control unit, and perform the bulk update on the table based on the rules specified by the control unit without the control unit accessing the table directly for the bulk update.

BRIEF DESCRIPTION OF THE DRAWINGS

The foregoing will be apparent from the following more particular description of example embodiments of the invention, as illustrated in the accompanying drawings in which like reference characters refer to the same parts throughout the different views.

FIG. 2 depicts an example of organization of table entries across one or more memory units in accordance with some embodiments.

FIG. 3 depicts an example of various fields/parameters in the rules provided by the control unit to the table managing unit for bulk update of table entries in accordance with some embodiments.

DETAILED DESCRIPTION

Figure 1:
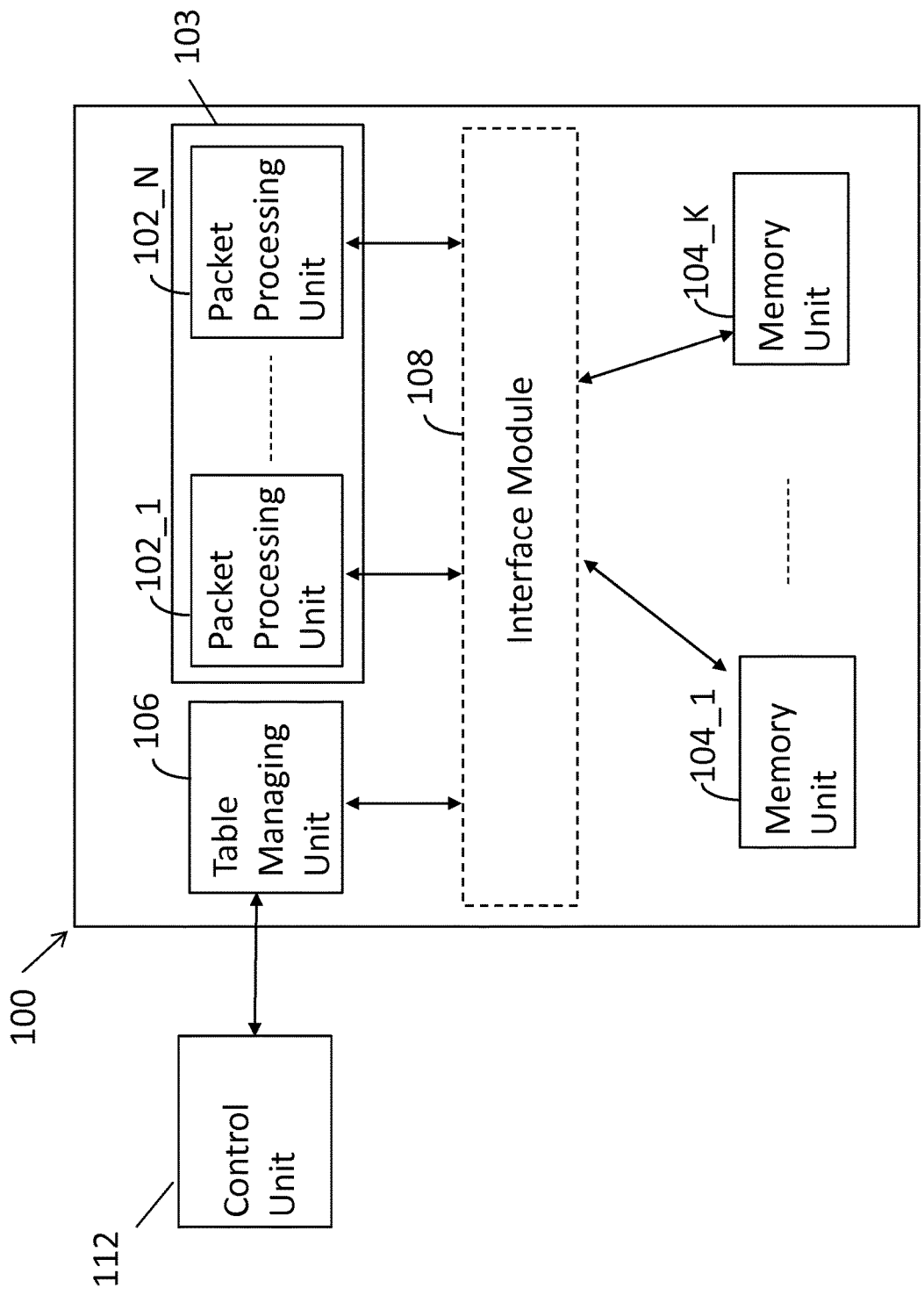
FIG. 1 illustrates an example of a diagram of a network switch configured to support bulk search table update in accordance with some embodiments.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

FIG. 1 illustrates an example of a diagram of a network switch 100 configured to support bulk search table update. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 1, the network switch 100 includes a plurality of packet processing units 102_1 through 102_n in a packet processing pipeline 103 configured to process a received data/communication packet through multiple stages based on table search results. The network switch 100 further includes one or more memory units 104_1 through 104_n configured to maintain the tables to be searched by the packet processing units 102s. The network switch 100 further includes a table managing unit 106 configured to monitor, access, and update the tables maintained by the memory units 104s. Here, the packet processing units 102s and the table managing unit 106 may either access the memory units 104s directly, or optionally through an interface module 108, which serves as an interface between the packet processing units 102s/the table managing unit 106 and the memory units 104s. During its operation, the interface module 108 is configured to accept instructions from the packet processing units 102s and the table managing unit 106, generate commands specific to the memory units 104s based on the instructions, collect table search or update results once execution of the commands across the memory units 104s is done, and return the collected results back to the packet processing units 102s and the table managing unit 106.

In the example of FIG. 1, each memory unit 104 can be of a variety of memory types that include but are not limited to static random-access memory (SRAM) and/or ternary content-addressable memory (TCAM). Here, a SRAM memory unit supports direct memory access and a TCAM memory unit encodes three possible states instead of two with a "Don't Care" or "X" state for one or more bits in a stored data word for additional flexibility.

In some embodiments, a packet processing unit 102 may have its own dedicated memory unit 104, which the packet processing unit 102 interacts with for search of the tables stored there, which can only be accessed by the packet processing unit 102. In some embodiments, each packet processing unit 102 is further configured to access other (e.g., neighboring) memory units 104s in addition to or instead of its own if the tables to be searched are stored across multiple memory units 104s. In some embodiments, a set of packet processing units 102s are configured to share one or more memory units 104s including the tables maintained on the shared memory units 104s.

In some embodiments, the memory units 104s can be flexibly configured to accommodate and store different table types as well as entry widths. In some embodiments, the table 200 may reside entirely in one memory unit 104. In some embodiments, the table may reside across multiple memory units 104, wherein each memory unit 104 maintains a portion (e.g., a plurality of rows) of the table 200. Since certain memory operations such as of hash table and longest prefix match (LPM) table lookup may require access to multiple memory units 104s simultaneously for best memory efficiency, more than one of the memory units 104s are configured to allow parallel access by a packet processing unit 102 and provide the search results (e.g., hit table entries) to the packet processing unit 102 at the same time. In some embodiments, multiple tables 200 can reside in the same memory units 104, allowing for access to each table 200 for different packets in time-domain-multiplexing fashion.

FIG. 2 depicts an example of organization of table entries across one or more memory units 104s, wherein each entry 202 in a table 200 has a pair of a key section 204 and a data/result section 206. In some embodiments, the table 200 stored within a memory unit 104 is assigned in row blocks, where each row block has a plurality (e.g. 1024) of memory rows/lines 107, and each memory line 107 has one or more table entries 202 at the same memory address. For non-limiting examples, each table entry 202 in the table 200 can be 32-bits, 64-bits, 128-bits, 256-bits or 512-bits in width, wherein each physical memory line 107 is 256-bits wide. As such, in some embodiments, each memory line 107 can store the key and result section of exactly one table entry 202. In some alternative embodiments, multiple entries 202 of key/result pairs of a table 200 can reside in one memory line 107 at the same memory address with lower bits of the address used to select the one of the multiple entries in the same memory line 107, and upper bits the address used to select the memory line 107. For the same table 200, all of its entries 202 have the same configuration in terms of its width and the number of entries 202 per memory line 107.

In the example of FIG. 1, a control unit/controller 112 is configured to communicate with the switch 100 to monitor and update the tables stored in the memory units 104s via the table managing unit 106. Here, the control unit 112 is external to the network switch 100. In some embodiments, the control unit 112 is another component on a same chip as the network switch 100. In some embodiments, the control unit 112 is a controller having a CPU or microprocessor and coupled to the switch 100 locally. In some embodiments, the control unit 112 is configured to interact with the network switch 100 remotely over a communication network following a communication protocol. In the case of Software Defined Networks (SDN), the control unit 112 belongs to the control plane on decisions about where traffic/packets are sent, which is decoupled from the switch 100, which is the data plane that forwards the packets to the selected destination.

During its operation, the control unit 112 is configured to provide the table managing unit 106 of the switch 100 with one or more instructions that include a plurality of rules on how to perform a bulk update on multiple entries in a search table maintained in one or more memory unit 104. Here, the control unit 112 only provides the bulk table update rules to the table managing unit 106 without accessing or performing any update to the entries in the search table. As such, the control unit 112 is configured to offload the search table update operations to the hardware of the network switch 100 and thus avoiding the heavy burden of the bulk update would have put on its CPU and the communication bandwidth with the network switch 100.

FIG. 3 depicts an example of various fields/parameters in the rules provided by the control unit 112 to the table managing unit 106 for bulk update of table entries. As shown in FIG. 3, the rules include an update enabling field "update_en", which informs the table managing unit 106 to perform a bulk update of entries in a table. If set, the "update_priority" field indicates that the bulk table update to be performed has a higher priority than the current traffic/packets being processed and routed by the switch 100, meaning that all such tabled-based processing and routing should be paused pending the completion of the bulk table update. The "memory_unit_id" identifies the memory unit 104 in which the table to be updated resides. In some embodiments, if the table resides across a plurality of memory units 104s, the control unit 112 needs to provide instructions for each of the memory units 104s needs to be updated. The "start_addr" and "end_addr" specify a range of consecutive memory rows/lines 107 in the identified memory unit 104 to be searched for matching entries of the table.

In some embodiments, each memory unit 104 has an associated bitmap having the same width as the memory line 107, wherein the bitmap represents the configuration of the table entries in the memory unit 104 in terms of the number of table entries 202 per memory line and what each bit in a table entry 202 represents. Note that the bitmap can be different for different tables in the same or different memory unit 104. As represented by the bitmap, every bit in the result/data section 206 of the table entry 202 may represent an element of the network switch 100 (e.g., an input port or an output port), where the key section 204 of the table entry 202 represents the corresponding value of the element (e.g., the port number). The "entry_width" represents the width of a table entry 202 in the memory line 107. As shown in FIG. 3, the "match_mask" having the same width as the memory line 107 indicates the element of the network switch 100 to be updated, where all bits corresponding to the key sections 204 are set to "1" (meaning don't care), and only the bit representing the element to be updated in the result sections 206 is set to "1" and the rest of the bits set to "0." The "match_pattern" also having the same width as the memory line 107 represents the matching value for the element identified via the bits corresponding to the key section 204 with the bits corresponding to the result section 206 set to "1" (don't care). For a non-limiting example, "output port #5" can be represented with only the "output port" bit in the result section of the "match_mask" set to "1" and the bits in the key section of the "match pattern" set to "5."

Once the table managing unit 106 finds a match of a table entry 202 using the "match_mask" and the "match pattern", it will proceed to update the matching table entry 202 using the "subst_mask" and "subst_pattern", which have the same configuration and meaning as the corresponding "match_mask" and the "match pattern." In some embodiments, the "subst mask" and the "match_mask" are the same, indicating the same type of element is being updated (e.g., "output port #5" is replaced by "output put #7"). In some embodiments, the "subst mask" and the "match_mask" are different, indicating that the current element of the network switch 100 in the table is being replaced by another element of the network switch 100.

Figure 4:
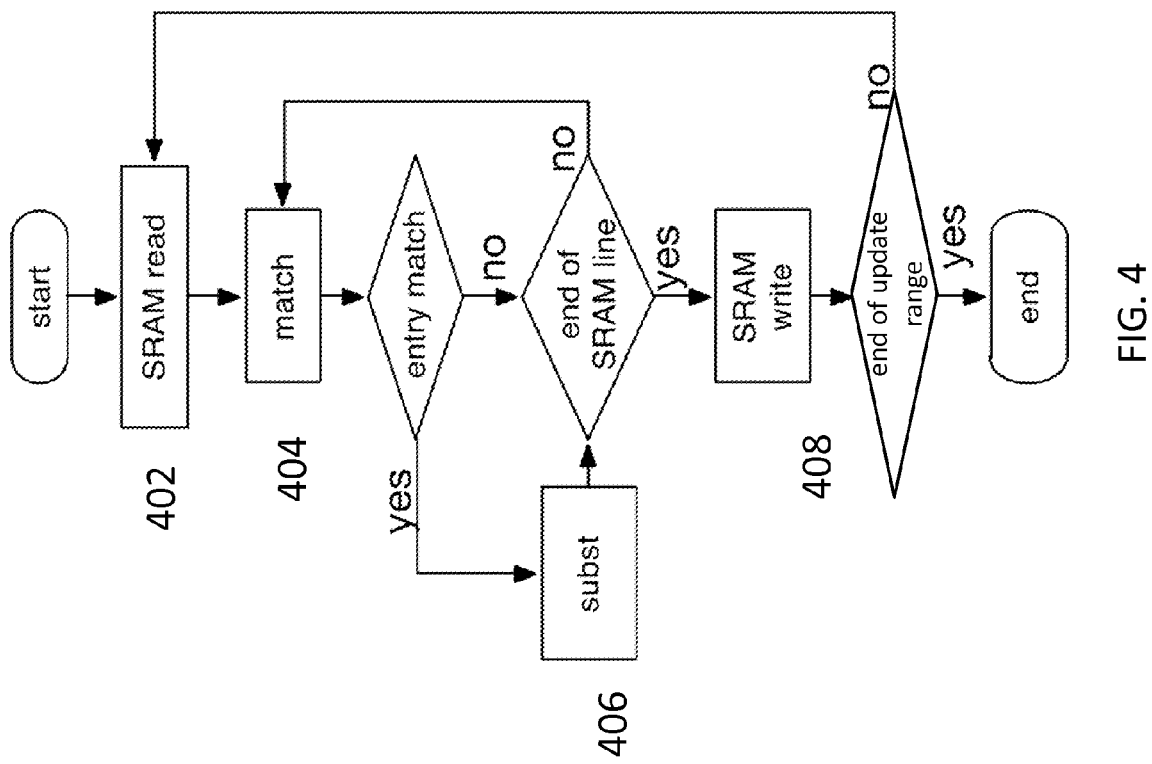
FIG. 4 depicts of an example of a process to support bulk search table update in accordance with some embodiments.

FIG. 4 depicts of an example of a process to support bulk search table update. Although the figure depicts functional steps in a particular order for purposes of illustration, the processes are not limited to any particular order or arrangement of steps. One skilled in the relevant art will appreciate that the various steps portrayed in this figure could be omitted, rearranged, combined and/or adapted in various ways.

In the example of FIG. 4, the flowchart 400 starts at block 402, where a memory line within a specified table update range of a memory unit is read. The flowchart 400 continues to block 404, where a table entry is retrieved from the memory line and matched with a specified matching mask and pattern. The flowchart 400 continues to block 406, where the table entry is updated based on a specified substitution mask and pattern if a matching is found. The steps 402-406 are repeated for every table entry in the memory line. The flowchart 400 then continues to block 408, where the updated table entries are committed/written back to the memory line in the memory unit. The steps 402-406 are repeated for every memory line within the specified table update range of the memory unit. Once all of the table entries memory lines within the specified range of the memory unit have been updated and committed, the table managing unit 106 is configured to report the result of the bulk update back to the control unit.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. A system to support bulk search table update for a network switch, comprising:
   said network switch, which comprises:
      a plurality of packet processing units configured to process a received packet through multiple packet processing stages based on search result of a table;
      one or more memory units configured to:
         maintain and search the table to be searched, wherein each memory row in the memory units is configured to store a plurality of entries in the table, wherein each entry in the table is in a pair of (key, result) sections;
         provide the search result to the packet processing units;
      a table managing unit configured to:
         accept a plurality of rules on bulk update to the table specified by a control unit;
         perform the bulk update on the table based on the specified rules by
         retrieving the entries in the table from each memory row within a table update range of the memory units specified in the rules;
         matching a matching pattern and a matching mask specified in the rules with the key and result sections of each of the retrieved entries, respectively, wherein the matching mask indicates an element of the network switch to be updated and the matching pattern represents the matching value for the element identified;
         updating the key and result sections of each of the table entries via a substitution pattern and a substitution mask specified in the rules, respectively if a matching is found;
         committing the updated table entries back to the memory row within the table update range of the memory units;
   said control unit configured to provide the plurality of rules on bulk update to the table managing unit without the control unit accessing the table directly for the bulk update.

2. The system of claim 1, further comprising:
   an interface module configured to:
      accept instructions from the packet processing units and/or the table managing unit;
      generate commands specific to the memory units based on the instructions;
      collect and return the results of executing the commands back to the packet processing units and/or the table managing unit.

3. The system of claim 1, wherein:
each of the memory units is a static random-access memory (SRAM) or ternary content-addressable memory.

4. The system of claim 1, wherein:
one of the packet processing units has its own dedicated memory unit that can only be accessed by the packet processing unit.

5. The system of claim 1, wherein:
more than one of the packet processing units share one of the memory units.

6. The system of claim 1, wherein:
one of the packet processing units is configured to access more than one of the memory units in parallel.

7. The system of claim 1, wherein:
each memory line in one of the memory units is configured to store only one entry in the table.

8. The system of claim 1, wherein:
all entries in the table have the same storage configuration in each memory line in the memory units.

9. The system of claim 1, wherein:
the control unit is another component on a same chip as the network switch.

10. The system of claim 1, wherein:
the control unit is configured to interact with the network switch remotely over a communication network following a communication protocol.

11. The system of claim 1, wherein:
the control unit is configured to offload the bulk update of the table to the network switch.

12. The system of claim 1, wherein:
the rules include parameters on priority of the bulk update with respect to the packet being processed, indicating that all tabled-based processing and routing is paused pending the completion of the bulk table update.

13. The system of claim 1, wherein:
each memory unit has an associated bitmap having the same width as the memory lines of the memory unit, wherein the bitmap represents configuration of the table entries in the memory unit.

14. The system of claim 1, wherein:
the substitution mask and the matching mask specified by the rules are the same, indicating that the same element of the network switch is being updated.

15. The system of claim 1, wherein:
the substitution mask and the matching mask specified by the rules are different, indicating that a current element of the network switch is being replaced by another element of the network switch.

16. The system of claim 1, wherein:
the table managing unit is configured to report result of the bulk update to the control unit.

17. A network switch to support bulk search table update, comprising:
a plurality of packet processing units configured to process a received packet through multiple packet processing stages based on search result of a table;
one or more memory units configured to:
    maintain and search the table to be searched, wherein each memory row in the memory units is configured to store a plurality of entries in the table, wherein each entry in the table is in a pair of (key, result) sections;
    process and provide the search result to the packet processing units;
a table managing unit configured to:
    accept a plurality of rules on bulk update to the table specified by a control unit;
    perform the bulk update on the table based on the specified rules without the control unit accessing the table directly for the bulk update by
        retrieving the entries in the table from each memory row within a table update range of the memory units specified in the rules;
        matching a matching pattern and a matching mask specified in the rules with the key and result sections of each of the retrieved entries, respectively, wherein the matching mask indicates an element of the network switch to be updated and the matching pattern represents the matching value for the element identified;
        updating the key and result sections of each of the table entries via a substitution pattern and a substitution mask specified in the rules, respectively if a matching is found;
        committing the updated table entries back to the memory row within the table update range of the memory units.

18. A method to support bulk search table update for a network switch, comprising:
maintaining a table used to process a received packet through multiple packet processing stages in one or more memory units of the network switch, wherein each memory row in the memory units is configured to store a plurality of entries in the table, wherein each entry in the table is in a pair of (key, result) sections;
providing to the switch a plurality of rules on bulk update to the table via a control unit;
accepting the plurality of rules on the bulk update to the table by the network switch;
    performing the bulk update on the table based on the specified rules without the control unit accessing the table directly for the bulk update by
        retrieving the entries in the table from each memory row within a table update range of the memory units specified in the rules;
        matching a matching pattern and a matching mask specified in the rules with the key and result sections of each of the retrieved entries, respectively, wherein the matching mask indicates an element of the network switch to be updated and the matching pattern represents the matching value for the element identified;
        updating the key and result sections of each of the table entries via a substitution pattern and a substitution mask specified in the rules, respectively if a matching is found;
        committing the updated table entries back to the memory row within the table update range of the memory units.

19. The method of claim 18, further comprising:
accessing more than one of the memory units in parallel.

20. The method of claim 18, further comprising:
storing only one entry in the table in each memory line in one of the memory units.

21. The method of claim 18, further comprising:
interacting with the network switch remotely over a communication network following a communication protocol.

22. The method of claim 18, further comprising:
offloading the bulk update of the table to the network switch.

23. The method of claim 18, further comprising:
including a bitmap in each of the memory units, wherein the bitmap has the same width as the memory lines of the memory unit, wherein the bitmap represents configuration of the table entries in the memory unit.

24. The method of claim 18, wherein:
the substitution mask and the matching mask specified by the rules are the same, indicating that the same element of the network switch is being updated.

25. The method of claim 18, wherein:
the substitution mask and the matching mask specified by the rules are different, indicating that a current element of the network switch is being replaced by another element of the network switch.

* * * * *